United States Patent [19]

Loas

[11] 4,043,764
[45] Aug. 23, 1977

[54] PROCESS FOR MANUFACTURING COMBUSTIBLE BRICKS FROM PLANT MATERIALS

[75] Inventor: Daniel Loas, Paris, France

[73] Assignee: Agence Nationale de Valorisation de la Recherche (ANVAR), Neuilly-sur-Seine, France

[21] Appl. No.: 677,848

[22] Filed: Apr. 16, 1976

[30] Foreign Application Priority Data

Apr. 18, 1975 France .................................. 75.12086

[51] Int. Cl.$^2$ ........................... C10L 5/00; C10L 5/22
[52] U.S. Cl. ................................... 44/10 A; 44/10 B; 44/13
[58] Field of Search ............ 44/1 D, 1 E, 10 B, 10 A, 44/15 B, 15 C, 15 D, 13; 195/8–10, 33

[56] References Cited

U.S. PATENT DOCUMENTS

| | | | |
|---|---|---|---|
| 379,490 | 3/1888 | Owen | 44/10 A |
| 1,032,391 | 7/1912 | Ewen et al. | 44/10 B |
| 1,503,304 | 7/1924 | Damon | 44/15 D |
| 1,534,236 | 4/1925 | Markoczi et al. | 195/10 |
| 2,212,444 | 8/1940 | Linker | 195/33 X |
| 2,382,568 | 8/1945 | Karim | 195/9 |

*Primary Examiner*—Carl F. Dees
*Attorney, Agent, or Firm*—Wenderoth, Lind & Ponack

[57] ABSTRACT

Combustible bricks are manufactured from plant materials by agglomeration under pressure of these materials after pulverization and drying. Prior to this, the plant materials are subjected to a fermentation and, in the course of fermentation, to a pulverization treatment while controlling this fermentation so as to obtain a destructuration of the cellulosic tissues of the plant materials without producing separation of the lignin.

This process produces small bricks having a good strength and a low moisture content.

11 Claims, 1 Drawing Figure

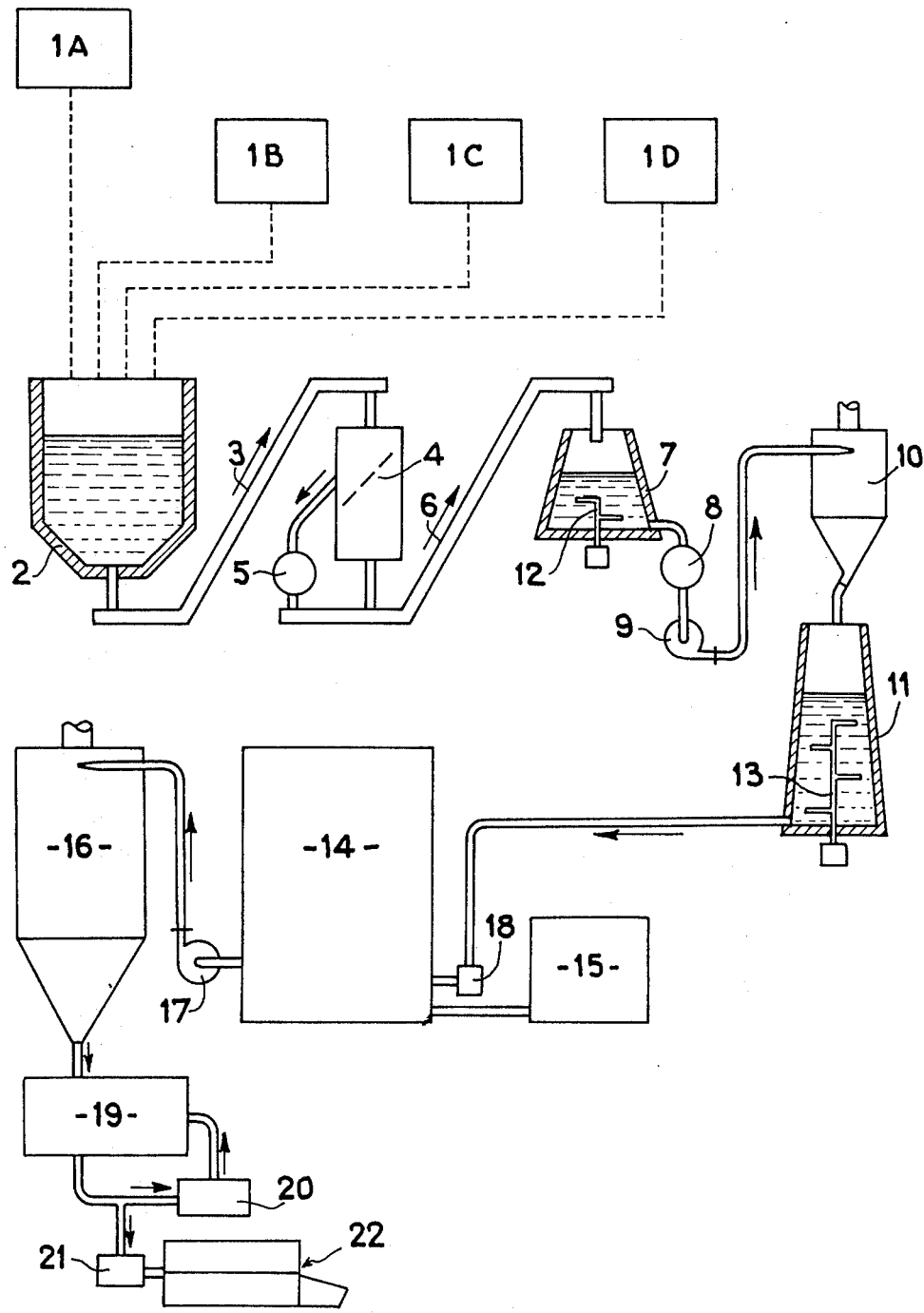

PROCESS FOR MANUFACTURING COMBUSTIBLE BRICKS FROM PLANT MATERIALS

BACKGROUND OF THE INVENTION

The present invention relates to a process for manufacturing small combustible bricks from plant materials and in particular to a process which does not employ binders.

The manufacture of combustible bricks by agglomeration, without an additional binder, of waste products of plant origin is already known. Various waste products have been employed for this, such as wood scrap, wood shavings, wood sawdust, shells of fruit or grains or plant fractions of industrial or town waste products.

By a continuous or discontinuous process, a press agglomerates these waste products so as to make small combustible bricks of various shapes and sizes therefrom.

Before being introduced into the press the waste products are directly and successively subjected to two treatments for their prior conditioning:

mechanical pulverization treatment for obtaining the necessary particle size (by means of shredders, crushers, grinders, etc);

and a drying heat treatment for bringing their moisture content to generally less than 15% (by means of driers with heat generators of various types).

However, and in particular with the cheaper continuous process, this manufacture without an additional binder gives rise to difficulties and defects:

a. The diversity of the origins of the waste products results, in the course of manufacture, in large variations in the characteristics of the material received by the press.

b. The extraction of moisture contained in the waste products requires for the drying relatively high temperatures, which may be as high as 400° C and these are harmful to the correct operation of the press and might result in localized carbonization with subsequent risk of spontaneous combustion of the bricks.

c. A moisture content of at least 10-11% is required for the agglomeration without a binder, which results in a reduction in the heating power/kilogram of the bricks, difficulties as concerns a correct combustion and a high content of steam in the smoke (resulting in condensations in the smoke flues and difficulties of utilization in respect of smoke curing houses and driers).

d. The bricks lack cohesion and uniformity in their structure and this renders them liable to break and deteriorate when being handled.

SUMMARY OF THE INVENTION

An object of the present invention is to overcome the aforementioned difficulties and defects by providing an improved process for manufacturing combustible bricks from plant materials by agglomeration of said materials under pressure after a pulverization and drying thereof.

According to the invention, there is provided a process comprising producing a prior fermentation of the plant materials and subjecting the materials in the course of fermentation to a pulverization treatment while controlling said fermentation so as to obtain a destructuration of the cellulosic tissues of the plant materials without producing separation of the lignin.

Thus, according to an essential feature of the present invention, fermentation phases are combined with the purely mechanical treatment of pulverization whereby a certain destructuration of the plant materials is obtained by both mechanical and biological means.

It has been found that, compared with the conventional treatment, this mechanical and biological treatment produces a material which is easier to dry and which furthermore may be dried to a lower moisture content. Indeed, in the process according to the invention, it is unnecessary to maintain a high moisture content to obtain an agglomeration of the particles, on the contrary, this content may be lowered to below 8%. Moreover, it has been found that the bricks obtained have a markedly increased strength. Note that it is very important to stop the fermentation before a separation of the lignin.

Indeed, it is believed, without however wishing to limit the invention by a theoretical explanation, that the lignin which is retained in the destructured material performs, as it wear, the function of a binder when the material is compressed in the form of small bricks so that a satisfactory agglomeration of the particles can be obtained.

In a preferred mode of carrying out the invention, the plant materials are subjected to a first fermentation stage by mixing these materials with other plant materials which are in an advanced stage of fermentation, and then the materials which start to ferment are subjected to a shredding and then to a second stage of fermentation, while stirring and, after pulverization, to a third stage of fermentation while stirring until the desired destructuration is achieved.

Such a combination of mechanical and biological treatments facilitates the mechanical treatments owing to the reduction in the strength of the materials which ferment, permits obtaining rapid fermentation reactions, and, above all, produces a well homogeneous product before the drying operation.

BRIEF DESCRIPTION OF THE DRAWING

Other features, objects and advantages of the invention will be apparent from the ensuing description with reference to the accompanying drawing which shows by way of example a general assembly diagram of an installation for carrying out the process according to the invention.

DETAILED DESCRIPTION OF THE INVENTION

Waste products of any plant origin intended for the manufacture of small combustible bricks, are stored in the regions 1A, 1B, 1C and 1D where they are grouped in accordance with their nature.

The waste products of one of these regions, namely the region 1A, are maintained at a certain stage of advanced fermentation.

The waste products of the regions 1B, 1C and 1D are brought to a silo 2 where they are mixed with waste products coming from the region 1A whose catalytic action initiates and accelerates fermentation reactions in the mass during the passage through this silo, which may take, for example, 48 hours.

The waste products are thereafter conveyed by a conveyor 3 to the station corresponding to the first mechanical treatment operation which is carried out by a screen 4 and a shredder 5 which achieves a first reduction in the size of the waste products and a removal of any metal parts which might be present.

The waste products are thereafter poured into a fermentation silo 7 by a conveyor 6. During the passage through this silo, which may last, for example, 12 hours, the fermentation continues and a destructuration of the products results which reduces the mechanical resistance to pulverization of the waste products which reach a pulverizer 8 (constituted for example by a hammer mill, crusher or grinder, etc) in respect of which the power consumption and wear are thus reduced.

A fan 9 and its cyclone 10 convey the pulverulent waste products pneumatically to a fermentation silo 11.

During the passage through the silo 11, which may last, for example, 12 hours, the fermentation of the pulverulent waste products is continued and terminated. Particles having an expanded structure are obtained and this facilitates the extraction of moisture during the drying. The moisture content has moreover being reduced by evaporation in the silo as a result of the heating produced by the exothermic fermentation reactions and also in the course of the passage of the products through the cyclone 10.

Consequently, it is now possible to carry out the drying with a lower consumption of heat-producing energy and above all with a lower temperature, below 200° C. This latter point is important, since it avoids the risk of carbonization and spontaneous combustion of the products.

In order to avoid any blocking of the waste products in the silos 7 and 11, these silos have advantageously a downwardly divergent frustoconical shape.

The fermentation silos 7 and 11 include stirring and mixing means, shown diagrammatically at 12 and 13 respectively, which may be, for example, in the form of horizontal screws or augers. These means ensure a homogenization throughout the mass in the course of fermentation. The evolution of the fermentation reactions is supervised by a checking of the rise in temperature resulting from these reactions.

It is possible to develop these reactions by the introduction in the silos of complementary elements for moistening or catalytic purposes with, if desired, the supply of heat, for example by employing a double-walled silo. It is further possible to slow these reactions down by addition of fermentation reaction inhibitors.

The particles issuing from the silo 11 are dried in a unit comprising a dryer 14 in which these particles are mixed with gases coming from a hot gas producer 15, and a cyclone 16 which discharges the gases and steam to the atmosphere. The circulation of the gases and the pulverulent product is ensured by a fan 17.

In order to maintain a drying temperature which is reduced to less than 200° C, a regulator 18 is provided at the inlet of the dryer to meter the supply of product to be dried in accordance with the temperature at the outlet of the dryer. By acting on the supply of the product instead of on the hot gas producer, a more rapid and more sensitive action is achieved for maintaining constant the temperature of lower than 200° C of the dried product whose moisture is brought to the low content of 5–8% or even of the order of 3%.

The drying temperature depends on the moisture content of the particles issuing from the silo 11 and is usually of the order of 60° to 150° C. Note that in some cases it is unnecessary to carry out such a drying since the moisture content was sufficiently reduced in the course of the prior treatments.

Thus prepared, the particles then reach the vessel 19 supplying the product to the presses. The vessel comprises a recycling device 20 which perfects the homogenization of the product which arrives, by way of a metering device 21, in a press 22 which agglomerates it into small bricks under the combined action of a mechanical compression and the heat resulting from this compression.

A very satisfactory agglomeration is thus obtained in the course of the compression, which agglomeration is facilitated by the homogeneous and stable nature of the suitably fermented materials and takes place notwithstanding the fact that the materials have a very low moisture content.

The process according to the invention provides the following advantages without use of an additional binder:

a. The obtainment of bricks of stable quality having greater strength with a reduced moisture content.

b. Improvement in the conditions of operation of the brick-producing equipment with a lower consumption of energy.

c. Use of a lower drying temperature so that fire hazards are reduced.

d. Possibility of employing simultaneously a larger variety of waste products, the structure of which is homogenized by the biochemical fermentation reactions.

A concrete example will now be given of a mode of carrying out the process according to the invention.

The storage regions 1A, 1B, 1C, 1D are constituted by mounds or heaps, 2 to 3 meters high, of waste products of plant origin.

Mound 1A concerns the storage of waste products (mixture of saw-dust, leaves and other forestry waste products) having an advanced state of fermentation within the mass resulting from having been left for several weeks. This state is manifested by a dark colour, emanation of vapours and a certain heating c30° to 50° C).

Mound 1B concerns the storage of resinous forestry waste products.

Mound 1C concerns the storage of foliage forestry waste products.

Mound 1D concerns the storage of industrial wood waste products (saw-dust and shavings).

The waste products are taken off by a shoveller in succession from the mass of 1A, 1B, 1C and 1D and poured into the silo 2 in alternating beds. The proportions are one scoop-full of 1A, 1B, 1C and two scoop-fulls of 1D. These proportions could be modified in accordance with the mean moisture content of 1B and 1C.

With this dosing and in accordance with the daily production, the level, and therefore the volume, of the waste products maintained in the silos corresponds to stays of:

- 24 hours in the silo 2 (dosing and initiation of the biochemical fermentation reactions),
- 12 hours in the silo 7 which precedes the pulverization, and
- 12 hours in the silo 11 which precedes the drying.

Horizontal augers or screws ensure in the silos 7 and 11 a mixing throughout the mass by a regulatable recycling and a homogenization of the product before it issues from the silo. The evolution of the reactions of fermentation in the silos is given by a supervision of the heating resulting from these reactions (about 30° to 60° C in the silo 7 and about 40° to 80° C in the silo 11).

The outlet of the silo 11 is controlled by the regulator 18 which is controlled by the temperature of the product dried at the outlet of the cyclone 16. The rate of flow of the pulverulent product driven along by the suction effect of the fan 17 is regulated in such manner as to maintain this temperature between 120° and 150° C.

By an addition of air controlled thermostatically, the gases coming from the furnace 15 have their temperature brought to between 300° and 350° C so as to avoid any risk of a localized carbonization of the product.

After separation of the gases, the product is once more homogenized by the recycling device 20 and then sent to the press for forming the bricks.

The particle size of the product, whose moisture content is brought to 5 to 8% before it is introduced into the press, is between 1 and 5 mm.

Having now described my invention what I claim as new and desire to secure by Letters Patent is:

1. In a process for manufacturing combustible bricks from plant materials comprising pulverizing the plant materials, drying the pulverized plant materials and agglomerating the dried pulverized materials under pressure into bricks without using additional binders, the improvement comprising mixing the plant materials with other plant materials in an advanced stage of self fermentation and subjecting the materials in the course of the fermentation to a pulverisation treatment, while controlling said fermentation until particles having an expanded structure have been obtained without producing a separation of the lignin from the cellulosic tissues.

2. Process as claimed in claim 1 comprising subjecting the plant materials to a first fermentation stage by mixing said materials with other plant materials in an advanced stage of self fermentation, then subjecting the materials which start to ferment to a shredding, then to a second fermentation stage while stirring and, after pulverization, to a third fermentation stage while stirring until particles having an expanded structure have been obtained.

3. A process as claimed in claim 1, wherein each fermentation stage is controlled by a supervision of the rise in the temperature resulting from the fermentation.

4. A process as claimed in claim 1, wherein the fermentation reactions are regulated by the addition of catalysts.

5. A process as claimed in claim 1, wherein the fermentation reactions are regulated by the addition of inhibitors of fermentation reactions.

6. A process as claimed in claim 1, wherein the drying temperature is regulated by a metering of the supply of the plant products to be dried.

7. A process as claimed in claim 1, comprising homogenizing by recycling the dried plant products before their agglomeration by compression.

8. An installation for manufacturing combustible bricks from plant materials by agglomeration under pressure of said materials after a pulverization and drying thereof, comprising a first metering silo for mixing and initiating a fermentation of the plant materials, a device for shredding the materials issuing from the first silo, a second silo provided with a stirring and mixing device for effecting a fermentation of the materials issuing from the second silo, a device for pulverizing the materials issuing from the second silo, and a third silo for effecting a fermentation of the pulverized materials.

9. An installation as claimed in claim 8, wherein the fermentation silos have a downwardly-flared frustoconical shape.

10. Process as claimed in claim 1 wherein the plant materials in an advanced stage of self fermentation are forestry waste product having an advanced state of fermentation within the mass resulting from having been left for several weeks.

11. Process as claimed in claim 1 wherein the plant materials are forestry waste products.

* * * * *